United States Patent

Inuiya et al.

[11] Patent Number: 6,028,971
[45] Date of Patent: Feb. 22, 2000

[54] SCANNER AND METHOD OF GENERATING INTERPOLATED PIXELS THEREIN

[75] Inventors: Masafumi Inuiya; Kenichiro Ayaki, both of Asaka, Japan

[73] Assignee: Fuji Photo Film Co., Ltd., Kanagawa, Japan

[21] Appl. No.: 08/940,812

[22] Filed: Sep. 30, 1997

[30] Foreign Application Priority Data

Sep. 30, 1996 [JP] Japan ..................................... 8-276931

[51] Int. Cl.$^7$ ..................................................... G06K 9/00
[52] U.S. Cl. ........................................... 382/312; 382/162
[58] Field of Search ............................ 600/407; 128/920, 128/923; 348/701, 620, 218, 335, 364, 111; 382/284, 162, 163, 165, 166, 167, 169, 224, 254, 260, 270, 272, 274, 275, 302, 307, 308, 282, 283, 309, 312, 317, 321, 318, 322, 323, 324, 313, 314, 315; 358/506, 516

[56] References Cited

U.S. PATENT DOCUMENTS

| | | | |
|---|---|---|---|
| 4,945,406 | 7/1990 | Cok | 358/80 |
| 4,969,054 | 11/1990 | Tsuji et al. | 382/313 |
| 5,038,216 | 8/1991 | Easterly et al. | 358/228 |
| 5,042,079 | 8/1991 | Morikawa et al. | 382/313 |
| 5,475,769 | 12/1995 | Wober et al. | 382/167 |
| 5,537,490 | 7/1996 | Yukawa | 382/316 |
| 5,550,653 | 8/1996 | Tewinkle et al. | 382/163 |
| 5,686,960 | 11/1997 | Sussman et al. | 348/218 |
| 5,740,801 | 4/1998 | Branson | 128/653.1 |
| 5,761,349 | 6/1998 | Inatome et al. | 382/312 |
| 5,877,819 | 3/1999 | Branson | 348/701 |

Primary Examiner—Bijan Tadayon

[57] ABSTRACT

A method of preventing the occurrence of false colors produced at the edge of an image of interest when the image is displayed upon being read by a scanner. When image data representing an interpolation target pixel at which image data is missing is produced, the arithmetic mean of pixels (e.g. $R_1$ and $R_5$) neighboring the interpolation target pixel on both sides thereof is calculated $[(R_1+R_5)/2]$ and corrective data $\Delta_3$ is added to the data representing the arithmetic mean. This makes it possible to prevent the occurrence of false colors at the edge of the image.

12 Claims, 9 Drawing Sheets

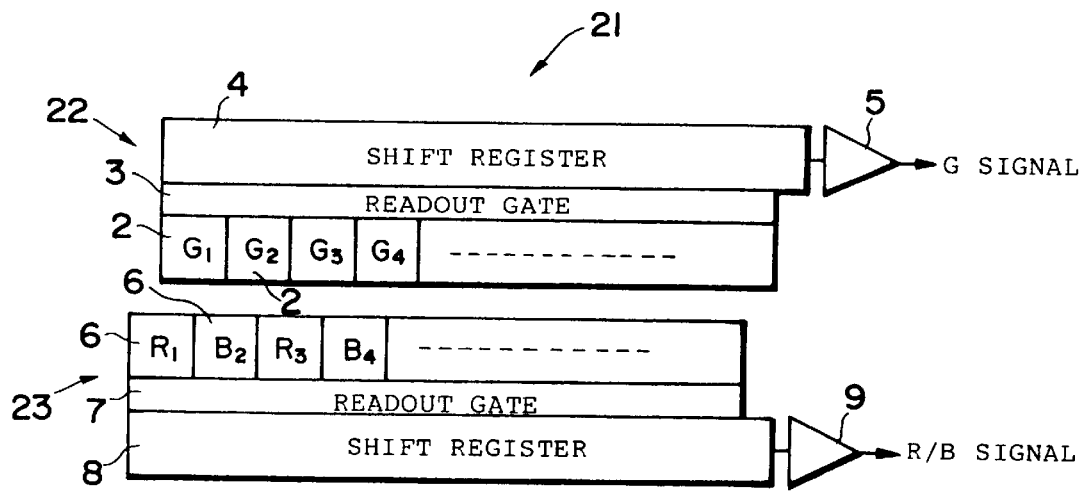
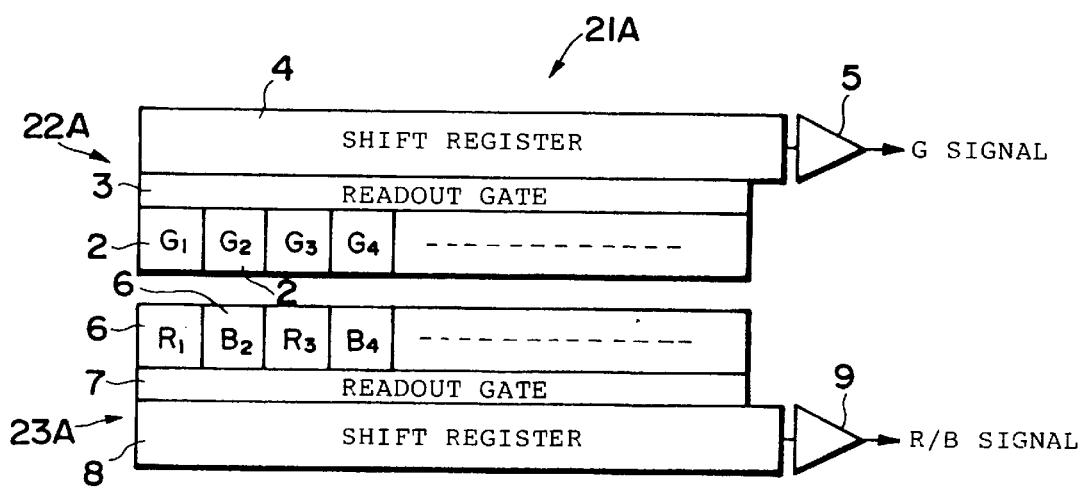

TWO-LINE SENSOR OUTPUT

AFTER SUBSAMPLING PROCESSING

AFTER COMBINING PROCESSING

AFTER RGB SEPARATION PROCESSING

AFTER INTERPOLATION PROCESSING $$\Delta_3 = G_3 - \frac{G_1 + G_5}{2} \qquad \Delta_7 = G_7 - \frac{G_5 + G_9}{2}$$

TWO-LINE SENSOR OUTPUT

AFTER RGB SEPARATION PROCESSING

AFTER INTERPOLATION PROCESSING $$\Delta_2 = G_2 - \frac{G_1+G_3}{2}$$

$$\Delta_3 = G_3 - \frac{G_2+G_4}{2}$$

$$\Delta_4 = G_4 - \frac{G_3+G_5}{2}$$

TWO-LINE SENSOR OUTPUT

AFTER RGB SEPARATION PROCESSING

AFTER INTERPOLATION PROCESSING

SCANNER AND METHOD OF GENERATING INTERPOLATED PIXELS THEREIN

BACKGROUND OF THE INVENTION

1. Field of the Invention

This invention relates to a scanner (inclusive of a color copier, a color facsimile machine, etc.) having a two-line sensor, which comprises a line sensor (a linear image sensor) for the color green in which a plurality of photodiodes (photo elements) corresponding to pixels are arranged in a row and filters which allow transmission of a green light component are provided on the light-receiving surfaces of the photo elements so that the sensor will output a green image signal representing an image of interest, and a line sensor for both the colors red and blue in which a plurality of photo elements corresponding to pixels are arranged in a row and in parallel with the line sensor for the color green and filters which allow transmission of a red light component and filters which allows transmission of a blue light component are alternately provided on the light-receiving surfaces of the photo elements so that the sensor will output a red image signal and a blue image signal representing the image of interest, and conveyance means for conveying the image of interest (and the two-line sensor relative to each other. The invention relates further to a method of generating interpolated pixels in this scanner.

2. Description of the Related Art

In a scanner of the kind described above, the number of pixels of the image of interest represented by the green image signal and the number of pixels of the image of interest represented by the blue or red image signal do not agree because the line sensor for the colors red and blue has the filters which allow the transmission of the red light component and the filters which allow the transmission of the blue light component provided on the light-receiving surfaces of the photo elements in alternating fashion. For this reason pixels are interpolated with regard to the image of interest represented by the blue image signal or red image signal so that the number of pixels will be made to coincide with the number of pixels of the image of interest represented by the green image signal. As a consequence of such pixel interpolation, the edge portion of the image of interest develops false colors when the image of interest read using a scanner is displayed.

In order to prevent the occurrence of false colors, an optical low-pass filter is inserted into image sensing optical system to eliminate the high-frequency components that are the cause of false color generation.

In the two-line sensor described above, the sampling frequency of the green image signal output by the line sensor for the color green and the sampling frequency of the red image signal and blue image signal output by the line sensor for the colors red and blue are different. Consequently, when the cut-off frequency of the optical low-pass filter is made to conform to the sampling frequency of the green color signal output by the line sensor for the color green, there are instances where the image of interest represented by the red image signal and the image of interest represented by the blue image signal develop false signals as before. When the cut-off frequency of the optical low-pass filter is made to conform to the sampling frequencies of the red image signal and blue image signal output by the line sensor for the colors red and blue, the resolution of the displayed image of interest declines.

SUMMARY OF THE INVENTION

Accordingly, an object of the present invention is to arrange it so that the occurrence of false colors can be prevented without causing a decline in resolution.

According to the present invention, the foregoing object is attained by providing a scanner having a two-linear image sensor (two-line sensor), which comprises a linear image sensor for the color green in which a plurality of photo elements (photodiodes) corresponding to pixels are arranged in a row and filters which allow transmission of a green light component are provided on the light-receiving surfaces of the photo elements so that the sensor will output a green image signal representing an image of interest, and a linear image sensor for both the colors red and blue in which a plurality of photo elements corresponding to pixels are arranged in a row and in parallel with the linear image sensor for the color green and filters which allow transmission of a red light component and filters which allows transmission of a blue light component are alternately provided on the light-receiving surfaces of the photo elements so that the sensor will output a red image signal and a blue image signal representing an image of interest, and a conveyance device for conveying the image of interest and the two-linear image sensor relative to each other, the scanner comprising a red-color average signal calculating device for calculating the average of pixel signals represented by the red image signals present on both sides of a red-color interpolation target pixel, which is a portion at which a pixel represented by the red image signal is missing, this pixel being one corresponding to a pixel represented by the green image signal, a red-color interpolation target pixel correcting device for correcting the average signal calculated by the red-color average signal calculating device, a blue-color average signal calculating device for calculating the average of pixel signals represented by the blue color image signals present on both sides of a blue-color interpolation target pixel, which is a portion at which a pixel represented by the blue image signal is missing, this pixel being one corresponding to a pixel represented by the green image signal, and a blue-color interpolation target pixel correcting device for correcting the average signal calculated by the blue-color average signal calculating device.

The present invention further provides a method of generating interpolated pixels in a scanner. Specifically, the invention provides a method of generating interpolated pixels in a scanner having a two-linear image sensor, which comprises a linear image sensor for the color green in which a plurality of photo elements corresponding to pixels are arranged in a row and filters which allow transmission of a green light component are provided on the light-receiving surfaces of the photo elements so that the sensor will output a green image signal representing an image of interest, and a linear image sensor for both the colors red and blue in which a plurality of photo elements corresponding to pixels are arranged in a row and in parallel with the linear image sensor for the color green and filters which allow transmission of a red light component and filters which allow transmission of a blue light component are alternately provided on the light-receiving surfaces of the photo elements so that the sensor will output a red image signal and a blue image signal representing an image of interest, and a conveyance device for conveying the image of interest and the two-linear image sensor relative to each other, the method comprising a first calculating step of calculating the average of pixel signals represented by the red image signals present on both sides of a red-color interpolation target pixel, which is a portion at which a pixel represented by the red image signal is missing, this pixel being one corresponding to a pixel represented by the green image signal, a first correcting step of correcting the average signal calculated at the first calculating step, a second calculating step of calculating the average of pixel signals represented by the blue color image signals present on both sides of a blue-color interpolation target pixel, which is a portion at which a pixel represented by the blue image signal is missing, this pixel being one corresponding to a pixel represented by the green image signal, and a second correcting step of correcting the average signal calculated at the second calculating step.

In accordance with the present invention, the average signal calculated by the red-color average signal calculation processing and the average signal calculated by the blue-color average signal calculation processing are each corrected. The corrected average signals represent the red-color interpolation target pixel and the blue-color interpolation target pixel.

Correcting the correction processing makes it possible to prevent the occurrence of false colors at the edge portion of the image of interest read by the two-linear image sensor. There is also no decline in resolution even when the image of interest is displayed.

By way of example, the correction processing is executed based upon the green image signal. More specifically, the correction may be performed based upon the signal of a green pixel represented by the above-mentioned green image signal and the signals of green pixels neighboring this green pixel on both sides thereof, this green pixel corresponding to the red-color interpolation target pixel and the blue-color interpolation target pixel. This correction may add a corrective value to the average signals. More specifically, the value added to the average signals may be obtained by subtracting an average signal of the green image signals representing the green pixels adjacent to both sides of the green pixel from the green image signal representing the green pixel corresponding to the red-color interpolation target pixel and blue-color interpolation target pixel.

The linear image sensor for the color green and the linear image sensor for the colors red and blue may be offset from each other by approximately one-half pixel in the row direction.

In order to produce an image of reduced size, a green pixel, red pixel and blue pixel represented by the green, red and blue image signals, respectively, output by the two-linear image sensor are each subsampled at the same subsampling ratio in accordance with a given subsampling ratio.

In this case the processing for calculating the average signal for the color red involves calculating the average of the signals of red pixels present on both sides of a red-color interpolation target pixel where a red pixel culled by the aforementioned subsampling and corresponding to a green pixel culled by subsampling is missing, and the processing for calculating the average signal for the color blue involves calculating the average of the signals of blue pixels present on both sides of a blue-color interpolation target pixel where a blue pixel culled by the aforementioned subsampling and corresponding to a green pixel culled by subsampling is missing.

In this case also the above-described correction processing is executed. This makes it possible to prevent the occurrence of a false color at the edge portion of an image obtained by reducing the size of the image of interest. A decline in resolution can be suppressed even in a case where this reduced image is displayed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a block diagram illustrating the electrical configuration of a two-line sensor according to the present invention;

FIG. 6 is a block diagram illustrating the electrical configuration of a two-line sensor according to the present invention;

DESCRIPTION OF THE PREFERRED EMBODIMENTS

Figure 1:
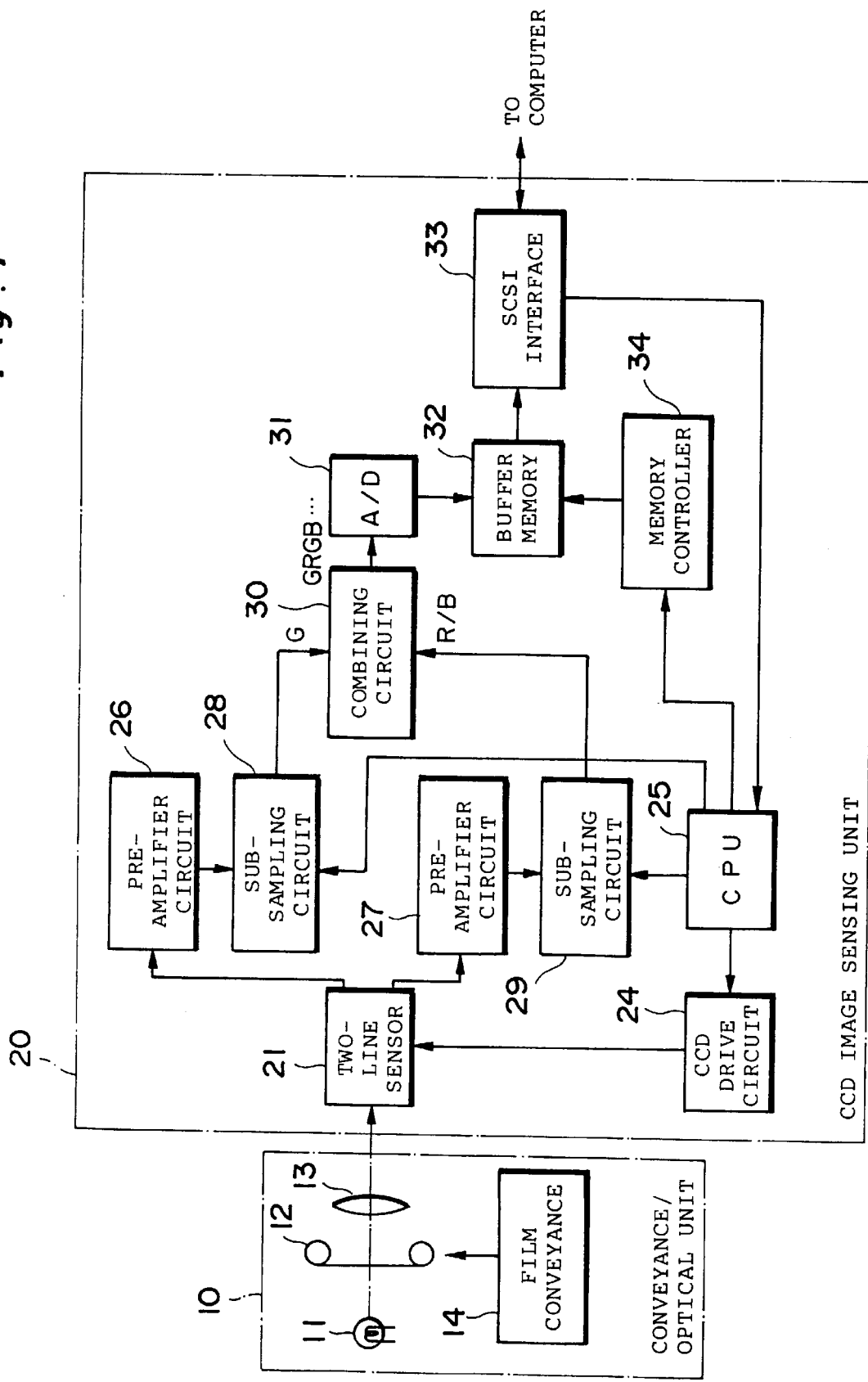
FIG. 1 is a block diagram illustrating the electrical configuration of a scanner according to the present invention.

Before describing embodiments of the present invention, we will discuss the principle according to which false colors are produced at the edge of a displayed image of interest in a case where the image of interest is read and displayed (or printed) using a two-line sensor.

FIG. 3 illustrates an example of the electrical configuration of a two-line sensor.

As shown in FIG. 3, a two-line sensor 21 is constituted by a line sensor 22 for the color green and a line sensor 23 for both the colors red and blue.

A plurality of photodiodes 2 corresponding to pixels are arranged in row in the line sensor 22 for the color green, and filters which allow the transmission of the green light component are provided on the light-receiving surfaces of the photodiodes 2. The output terminals of the plurality of photodiodes 2 arranged in the row are connected to a shift register 4 via a readout gate 3.

Signal charge commensurate with the amount of incident light accumulates in the photodiodes 2. The signal charge is applied to the shift register 4 via the readout gate 3 by applying a gate pulse to the readout gate 3. Applying a transfer pulse to the shift register 4 transfers the signal charge through the shift register so that the charge is output from the two-line sensor 21, via an amplifier circuit 5, as a G (green) signal representing the green component of an image of interest.

The line sensor 23 for the colors red and blue has a plurality of photodiodes 6, which correspond to pixels, arranged in a row in a manner similar to the line sensor 22 for green. Here the line sensor 23 for red and blue is offset by one-half pixel relative to the line sensor 22 for green. In the case of the line sensor 23 for red and blue, filters which allow the transmission of the red light component and filters which allow the transmission of the blue light component are provided on the light-receiving surfaces of the photodiodes 6 alternately every other pixel. (In FIG. 3, photodiodes 6 provided with the filters which allow the transmission of the red light component are indicated by the character R while photodiodes 6 provided with the filters which allow the transmission of the blue light component are indicated by the character B.) The output terminals of the plurality of photodiodes 6 arranged in the row are connected to a shift register 8 via a readout gate 7.

Again, as in the line sensor 22 for green, signal charge that has accumulated in the photodiodes 6 is applied to the shift register 8 by applying a gate pulse to the readout gate 7. Applying a transfer pulse to the shift register 8 transfers the signal charge through the shift register so that the charge is output from the two-line sensor 21, via an amplifier circuit 9, alternately as an R (red) signal representing the red component of an image of interest and B (blue) signal representing the blue component of the image of interest. The output signal is indicated as an "R/B signal".

Figure 8A:
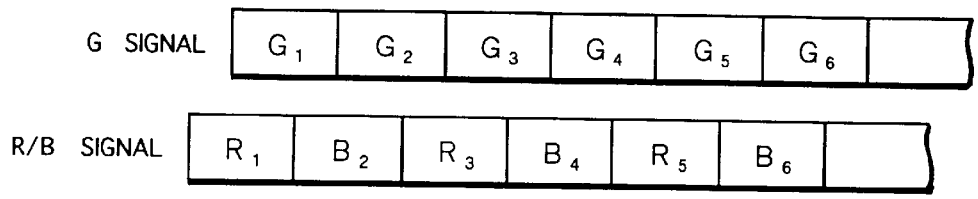
FIGS. 8a through 8c illustrate data (signals) that flow into the various circuits of the scanner and computer according to the present invention.
Figure 8B:
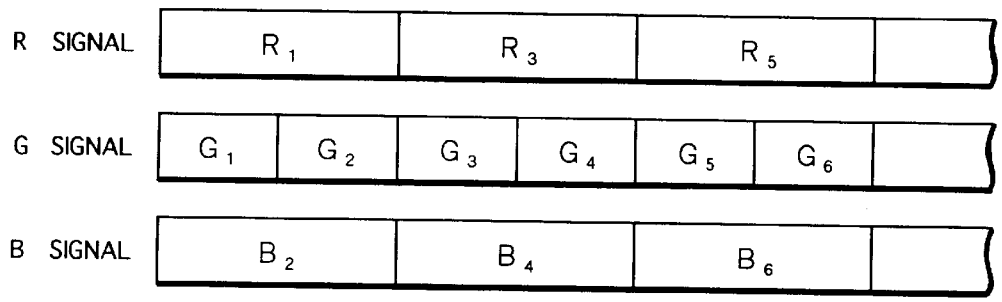

The G signal and R/B signal output by the two-line sensor 21 are illustrated in FIG. 8a. The G signal and the R/B signal are separated into G, R and B signals in an RGB separation circuit (FIG. 8b). Since the line sensor 23 for red and blue has the filters for allowing the transmission of the red light component and the filters for allowing transmission of the blue light component provided on the light-receiving surfaces of the photodiodes 6 in alternating fashion, the number of pixels of the image of interest represented by the R signal and the number of pixels of the image of interest represented by the B signal are half the number of pixels of the image of interest represented by the G signal. It is required that the numbers of pixels of the image of interests represented by the R, B and G signals be made to agree. To accomplish this, interpolation processing is applied to the R and B signals (see FIG. 8c). The pixels neighboring the G signal are averaged.

Figure 8C:
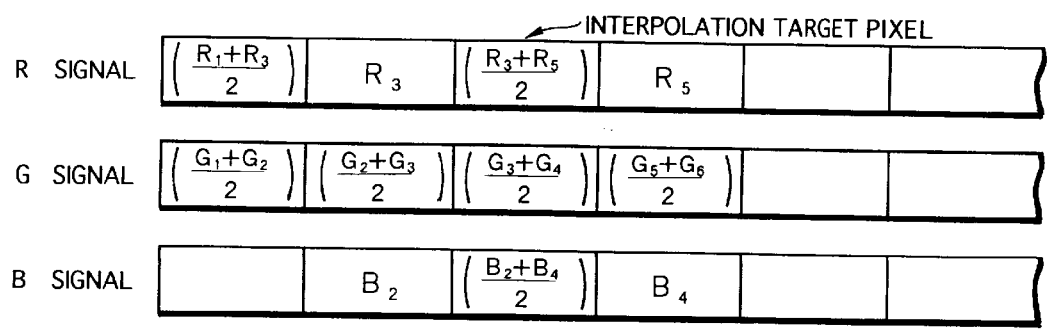

For example, shown in FIG. 8c, a pixel represented by an R signal which corresponds to a pixel $(G_3+G_4)/2$ represented by a G signal is missing. This missing portion is an interpolation target pixel produced by interpolation. A signal representing this interpolation target pixel is produced by the arithmetic mean $[(R_3+R_5)/2]$ of the signals of the two pixels ($R_3$ and $R_5$) neighboring the interpolation target pixel.

Figure 9A:
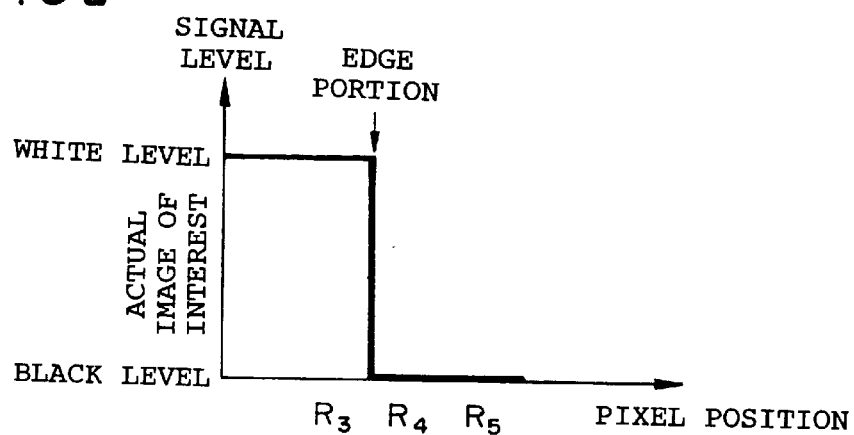
FIGS. 9a and 9b illustrate the occurrence of false colors.

FIG. 9a illustrates the level of a signal representing the edge of an image of interest.

Figure 9B:
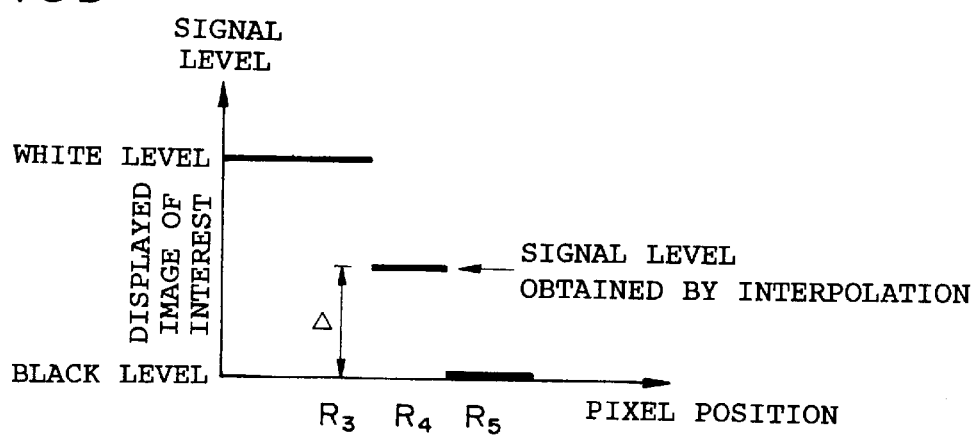

The portion of the pixel $R_3$ in FIG. 9a is a white level and the portions of pixels $R_4$ and $R_5$ is a black level. The boundary between the portion of pixel $R_3$ and the portion of pixel $R_4$ is the edge of the image of interest. The signal level declines at the boundary. In the two-line sensor 21, a photodiode 6 corresponding to the pixel $R_3$ and a photodiode 6 corresponding to the pixel $R_5$ exist but a photodiode 6 corresponding to the pixel $R_4$ does not exist because it is being used for the B signal. For this reason the pixel representing the pixel $R_4$ is generated by interpolation processing in the manner described above. The signal level after interpolation processing is executed is composed of a white level and a black level, just as in the actual image of interest, with regard to the pixels $R_3$ and $R_5$, as illustrated in FIG. 9b. However, the signal corresponding to the pixel $R_4$ obtained by interpolation is obtained by the arithmetic mean of the pixels $R_3$ and $R_5$. As a result, regardless of the fact that the actual image of interest has a black level, here the level is intermediate the white and black levels. A false color is produced as a consequence. The same is true with regard to the B signal independently of the R signal.

Figure 10:
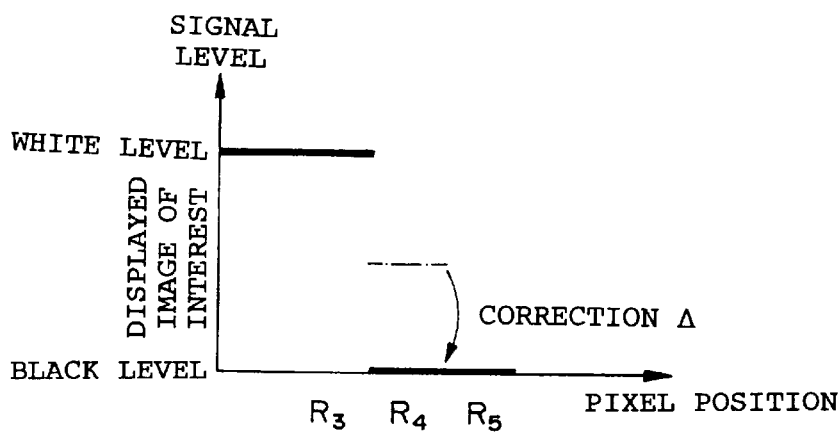
FIG. 10 illustrates the prevention of the occurrence of false signals according to the present invention.

The scanner system according to this embodiment prevents the occurrence of false colors by correcting the signals produced by interpolation processing. Specifically, as shown in FIG. 10, a corrective value Δ is added to the signal that corresponds to the pixel $R_4$ obtained by interpolation. [Here Δ is determined on the basis of the pixel represented by the G signal corresponding to the interpolation target pixel and the pixels neighboring this pixel on both sides thereof. In case of $R_4$, we have $\Delta=G_4-(G_3+G_5)/2$.] As a result of this correction, the signal level of the interpolation target pixel is made to agree with the actual image of interest so that the occurrence of false colors can be prevented.

The scanner system according to this embodiment will now be described. The scanner system is constituted by a scanner and a computer.

Figure 2:
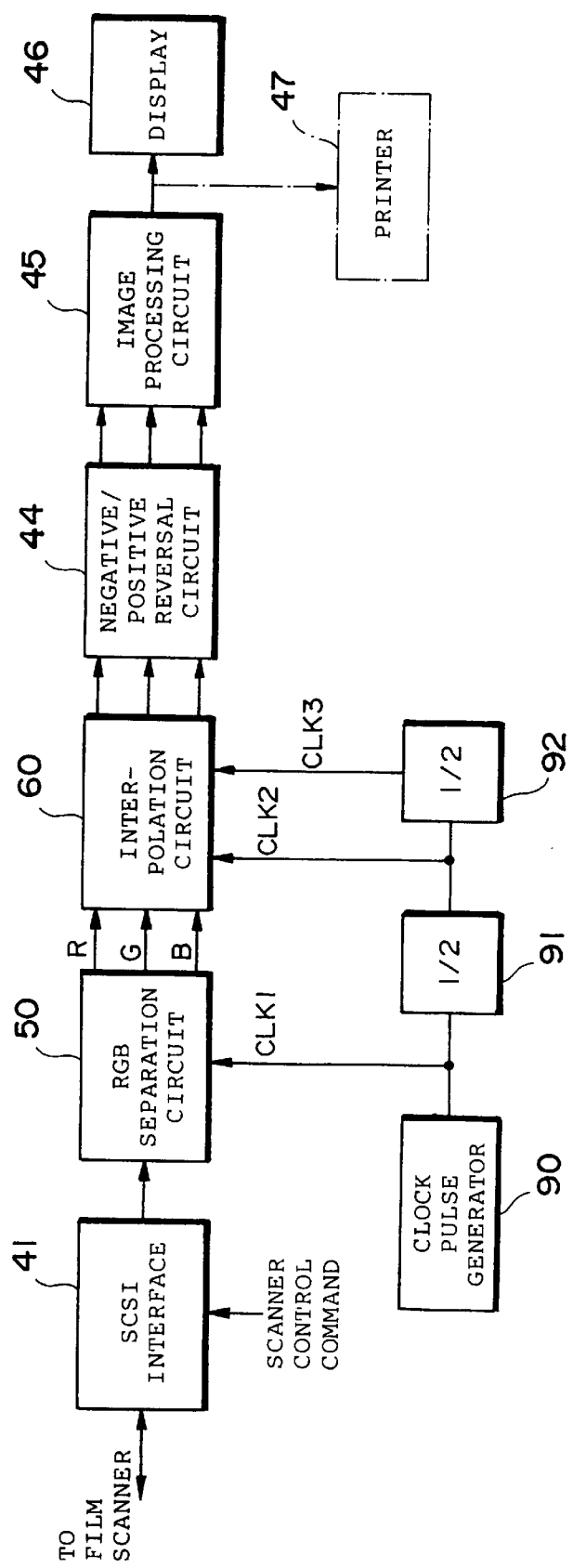
FIG. 2 is a block diagram illustrating the electrical configuration of a computer according to the present invention.
Figure 4:
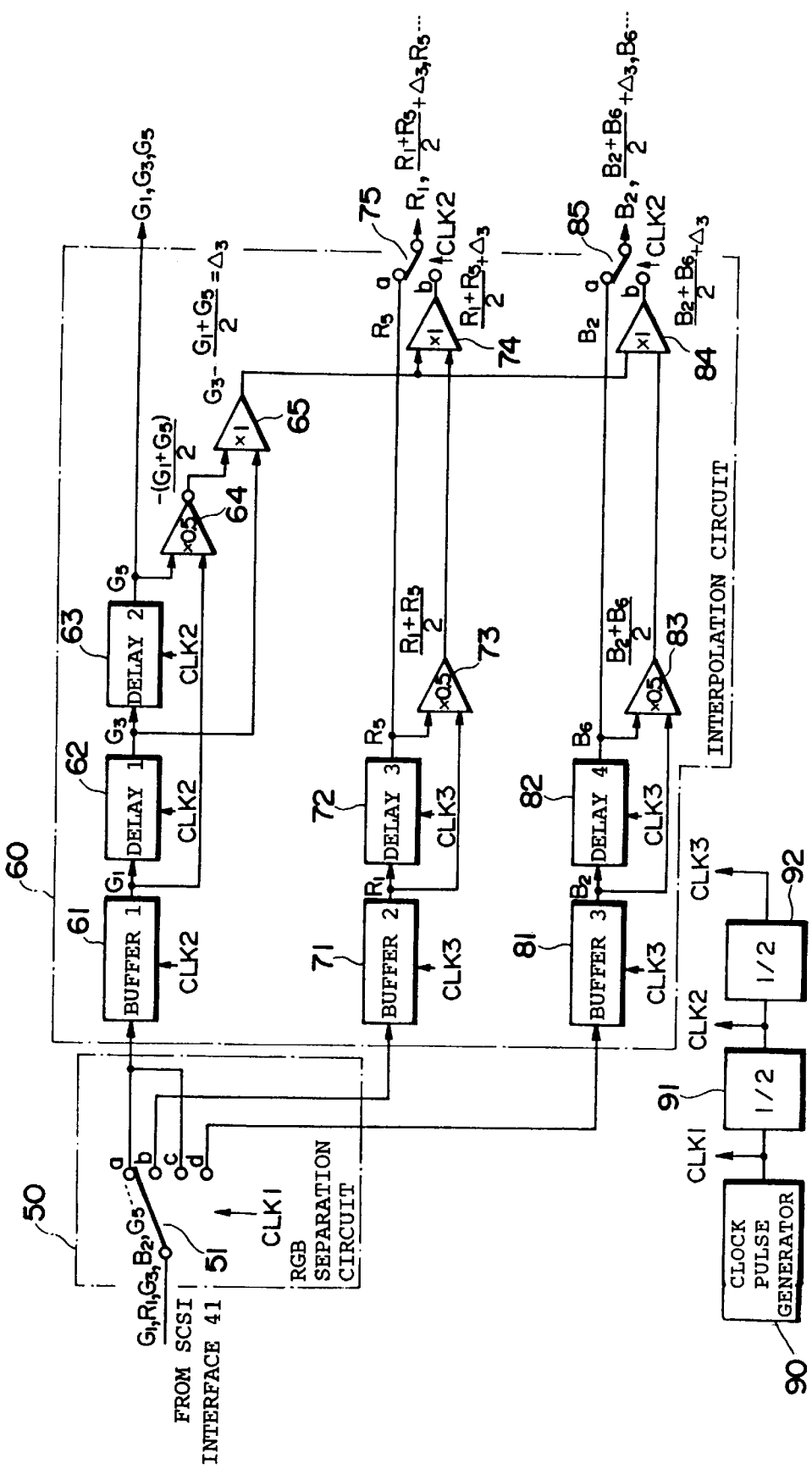
FIG. 4 is a block diagram illustrating the electrical configurations of an RGB separation circuit and interpolation circuit.

FIG. 1 is a block diagram illustrating the electrical configuration of the scanner, FIG. 2 is a block diagram illustrating the electrical configuration of the computer which controls the scanner, FIG. 3 is a block diagram illustrating the electrical configuration of the two-line sensor 21, FIG. 4 is a block diagram illustrating the electrical configurations of an RGB separation circuit 50 and interpolation circuit 60, and FIG. 5 illustrates the G signal (G data), R/B signal, R signal (R data) and B signal (B data).

The scanner includes a conveyance/optical unit 10 and a CCD image sensing unit 20, as depicted in FIG. 1.

The conveyance/optical unit 10 includes a film conveyance mechanism 14 for conveying a photographic film 12. A light source 11 and an image sensing lens 13 are disposed on opposing sides of the photographic film 12. A desired frame (the image of interest) of the photographic film 12 is illuminated by the light source 11 and the light image representing the image of interest is formed on the light-receiving surfaces of the photodiodes 2 and 6 included in the two-line sensor 21 by the image sensing lens 13.

The overall operation of the CCD image sensing unit 20 is supervised by the CPU 25. A control command from the computer is applied to the CPU 25 via an SCSI (Small Computer System Interface) 33 and the operation of the CCD image sensing unit 20 is controlled in accordance with the control command.

The two-line sensor 21 is controlled by a CCD drive circuit 24 controlled by the CPU 25. The CCD drive circuit 24 outputs a signal-charge accumulation control pulse (shutter control signal), which controls the accumulation of signal charge in the photodiodes 2 and 6, as well as the above-mentioned gate pulse and transfer pulse, and these pulses are applied to the two-line sensor 21. As a result, the two-line sensor 21 outputs the G signal and the R/B signal in the manner set forth above. The G signal has a resolution of a number of pixels that corresponds to the number of photodiodes 2. The R/B signal appears as alternating R and B signals (see FIG. 5a).

The G signal output by the two-line sensor 21 is amplified by a preamplifier circuit 26 and is then subsampled in a subsampling circuit 28 in accordance with a subsampling ratio provided by the CPU 25. (Here the subsampling ratio is assumed to be set at 50%.) The subsampling ratio is contained in the control command provided by the computer. The G signal is subsampled every other pixel by the subsampling processing executed by the subsampling circuit 28. The subsampled G signal is applied to a combining circuit 20.

Figure 5A:
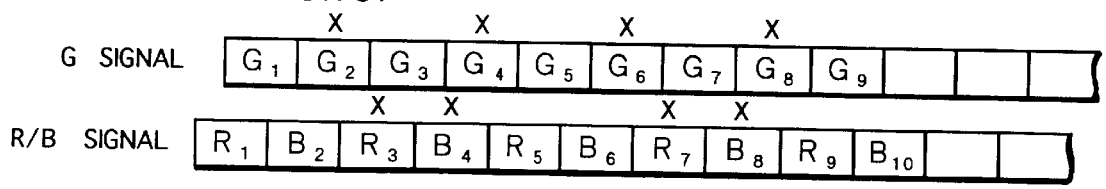
FIGS. 5a through 5e illustrate data (signals) that flow into the various circuits of the scanner and computer.
Figure 5B:
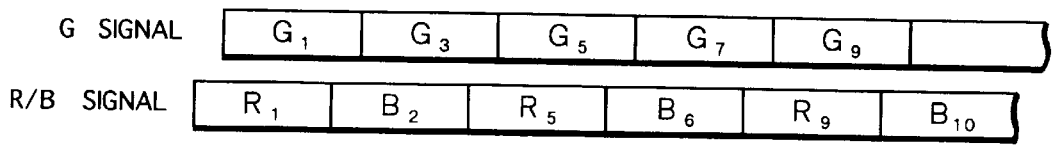

The R/B signal output by the two-line sensor 21 is amplified by a preamplifier circuit 27 before being applied to a subsampling circuit 29, where the R/B signal is subsampled in accordance with a subsampling ratio (50%) provided by the CPU 25. The R/B signal is subsampled every other pixel pair (where an R pixel and a B pixel are considered as being a pair) by subsampling processing in the subsampling circuit 29 (FIG. 5*b*). The subsampled R/B signal is applied to the combining circuit 30. Pixels subsampled by the subsampling circuit 28 or 29 are indicated by x marks in FIG. 5*a*.

Figure 5C:
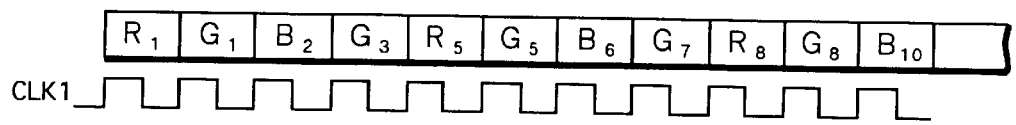
Figure 5D:
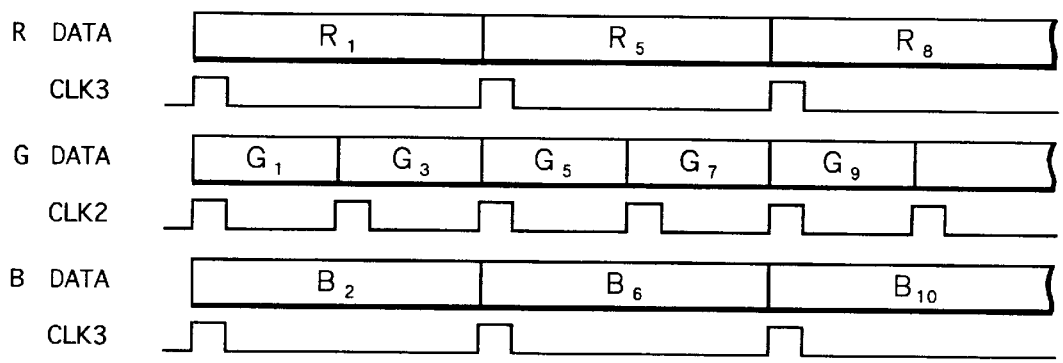

The entered G signal and R/B signal are rendered dot sequential in the combining circuit 30 (see FIG. 5*c*). The dot sequential signal output by the combining circuit 30 is converted to digital image data in an analog/digital conversion circuit 31 and the digital image data is applied to a buffer memory 32. The digital image data is stored in the buffer memory 32 temporarily under the control of a memory controller 34. The digital image data stored temporarily in the buffer memory 32 is read out and output via an SCSI interface 33.

The digital image data output by the scanner enters the computer via an SCSI interface 41, whence the digital image data enters the RGB separation circuit 50.

The computer includes a clock pulse generator 90. The latter outputs a first pixel clock pulse CLK1, which corresponds to a pixel of the dot sequential digital image data illustrated in FIG. 5*c*. The pixel clock pulse CLK1 is applied to the RGB separation circuit 50 and to ½ frequency divider circuit 91, whereby a second pixel clock pulse CLK2 is obtained. The second pixel clock pulse CLK2 is applied to a ½ frequency divider circuit 92, whereby a third pixel clock pulse CLK3 is obtained (see FIG. 5*d*). The second pixel clock pulse CLK2 and the third pixel clock pulse CLK3 are applied to an interpolation circuit 60.

The digital image data output by the SCSI interface 41 is separated into R, G and B data by the RGB separation circuit 50. The R, G and B data output by the RGB separation circuit 50 is applied to the interpolation circuit 60, which executes processing for producing image data of an interpolation target pixel. The processing executed in the RGB separation circuit 50 for separating the R, G and B data and the processing executed by the interpolation circuit 60 will be described later in greater detail.

The R, G and B data output by the interpolation circuit 60 is applied to a negative/positive reversal circuit 44. If the photographic film 12 that has been loaded in the scanner is negative film, then negative/positive reversal processing is executed by the negative/positive reversal circuit 44. If the photographic film 12 that has been loaded in the scanner is positive film, then the R, G, B data that has been entered into the negative/positive reversal circuit 44 merely passes through the circuit 44 without undergoing processing.

The R, G, B data output by the negative/positive reversal circuit 44 is applied to an image processing circuit 45. The image processing circuit 45 executes image processing such as image clipping processing and color correction processing and outputs the processed signal as image data.

The image data output by the image processing circuit 45 is applied to a monitor display unit 46, whereby the image data is displayed. The image data is also applied to and printed by a printer 47 as necessary.

The RGB separation processing and interpolation processing will now be described.

The dot sequential image data output by the SCSI interface 41 is applied to the RGB separation circuit 50, as shown in FIG. 4.

The RGB separation circuit 50 includes a changeover switch 51. The latter has terminals a through d and changes over these terminals in order in response to application of the first pixel clock pulse CLK1 output by the clock pulse generator 90. As a result, the G data is applied to terminals a and c, the R data to the terminal b and the B data to the data d.

The terminals a and c of the changeover switch 51 are connected to a first buffer circuit 61 so that the G data is applied to the first buffer circuit 61. The terminal b of the changeover switch 51 is connected to a second buffer circuit 71 to apply the R data to the second buffer circuit 71, and the terminal d of the changeover switch 51 is connected to a third buffer circuit 81 to apply the B data to the third buffer circuit 81.

The G data output by the first buffer circuit 61 is applied to a first delay circuit 62 so that the G data is output upon being delayed by one pixel. The G data output upon being delayed by one pixel in the first delay circuit 62 is applied to a second delay circuit 63 so as to be delayed by a further pixel before being output. The output of the second delay circuit 63 is one item of data among the data output by the interpolation circuit 60. The G data output by the first buffer circuit 61 and the G data output by the second delay circuit 63 is applied to an inverting amplifier circuit 64. The inverting amplifier circuit 64, which has an amplification factor of 0.5, adds the two items of input G data, inverts the sign of the sum to negative and outputs the result. The output data of the inverting amplifier circuit 64 is applied to a non-inverting amplifier circuit 65. The latter is provided also with the image data output by the first delay circuit 62. The non-inverting amplifier circuit 65, which has an amplification factor of 1.0, adds the two items of input G data and outputs the sum. The output data from the non-inverting amplifier circuit 65 is the corrective data for preventing the occurrence of false colors in the manner described earlier.

The R data output by the second buffer circuit 71 is applied to a third delay circuit 72 so that the R data is output upon being delayed by one pixel. The R data output by the third delay circuit 72 is applied to a terminal a of a changeover switch 75 and to a non-inverting amplifier circuit 73. The R data output by the second buffer circuit 71 also is applied to the non-inverting amplifier circuit 73. The latter, which has an amplification factor of 0.5, adds the two items of input R data and outputs the sum. Thus the non-inverting amplifier circuit 73 calculates the average of the image data of the pixels neighboring the interpolation target pixel on both sides thereof. The output data from the non-inverting amplifier circuit 73 is applied to a non-inverting amplifier circuit 74. The corrective data output by the non-inverting amplifier circuit 64 also is applied to non-inverting amplifier circuit 74. The latter, which has an amplification factor of 1.0, adds the input data and outputs the sum. The output data from the non-inverting amplifier circuit 74 is image data representing the interpolation target pixel and is applied to a terminal b of the changeover switch 75.

The second pixel clock signal CLK2 is applied to the changeover switch 75, which switches between the terminals a and b in response to the second pixel clock pulse CLK2. The changeover switch 75 outputs the R data, which includes the data representing the interpolation target pixel. This is one item of data among the data output by the interpolation circuit 60.

The B data output by the third buffer circuit 81 is applied to a fourth delay circuit 82 so that the B data is output upon being delayed by one pixel. The B data output by the fourth delay circuit 82 is applied to a terminal a of a changeover switch 85 and to a non-inverting amplifier circuit 83. The B data output by the third buffer circuit 81 also is applied to the non-inverting amplifier circuit 83. The latter, which has an amplification factor of 0.5, adds the two items of input B data and outputs the sum. Thus the non-inverting amplifier circuit 83 calculates the average of the image data of the pixels neighboring the interpolation target pixel on both sides thereof. The output data from the non-inverting amplifier circuit 83 is applied to a non-inverting amplifier circuit 84. The corrective data output by the non-inverting amplifier circuit 65 also is applied to non-inverting amplifier circuit 84. The latter, which has an amplification factor of 1.0, adds the input data and outputs the sum. The output data from the non-inverting amplifier circuit 84 is image data representing the interpolation target pixel and is applied to a terminal b of the changeover switch 85.

The second pixel clock signal CLK2 is applied to the changeover switch 85, which switches between the terminals a and b in response to the second pixel clock pulse CLK2. The changeover switch 85 outputs the B data, which includes the data representing the interpolation target pixel. This is one item of data among the data output by the interpolation circuit 60.

Among the data output by the interpolation circuit 60, the data representing the interpolation target pixel is not data which makes use of the arithmetic mean of the image data neighboring the interpolation target pixel on both sides; rather, data obtained by correcting the data obtained by this arithmetic mean is employed. As a result, the occurrence of false colors can be prevented, in the manner shown in FIG. 10, even at the edge of the image of interest.

Figure 5E:
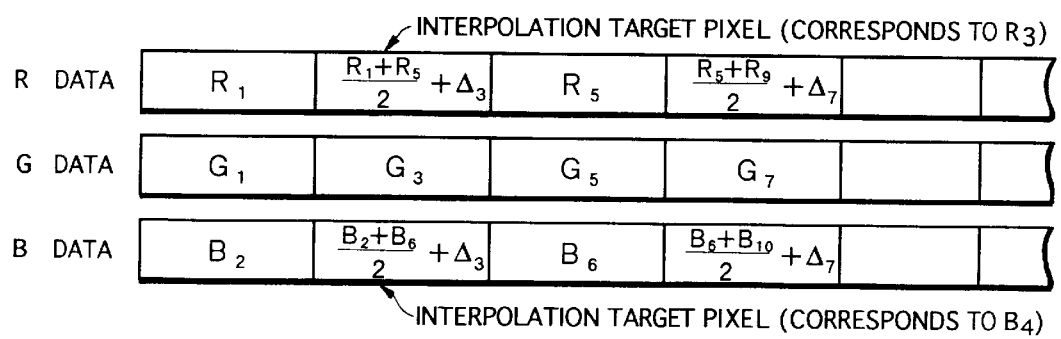

Assume that a pixel corresponding to $R_3$ and a pixel corresponding to $B_4$ are generated as interpolation target pixels, as referring to FIG. 4 and FIG. 5e.

In this case, the first buffer circuit 61, the first delay circuit 62 and the second delay circuit 63 output $G_1$ data, $G_3$ data and $G_5$ data, respectively, as illustrated in FIG. 4. Since the $G_1$ data and $G_5$ data enter the non-inverting amplifier circuit 64, data of a negative sign representing the arithmetic mean of the $G_1$ data and $G_5$ data is obtained from the non-inverting amplifier circuit 64. The data which is the negative of the arithmetic mean of the $G_1$ data and $G_5$ data as well as the $G_3$ data enters the non-inverting amplifier circuit 65. As a result, $G_3-(G_1+G_5)/2$ is obtained as corrective data $\Delta_3$.

Further, the second buffer circuit 71 and third delay circuit 72 output the $R_1$ data and the $R_5$ data, respectively. Since the R1 data and $R_5$ data enter the non-inverting amplifier circuit 73, the latter provides data indicating the arithmetic mean of the $R_1$ data and $R_5$ data.

Thus the non-inverting amplifier circuit 74 outputs data that is the result of adding the corrective data $\Delta_3$ to the data representing the arithmetic mean of the $R_1$ data and $R_5$ data so that data $(R_1+R_5)/2+\Delta_3$ representing the interpolation target pixel corresponding to the $R_3$ pixel is obtained.

Further, the third buffer circuit 81 and fourth delay circuit 82 output the $B_2$ data and the $B_6$ data, respectively. Since the $B_2$ data and $B_6$ data enter the non-inverting amplifier circuit 83, the latter provides data indicating the arithmetic mean of the $B_2$ data and $B_6$ data.

Thus the non-inverting amplifier circuit 83 outputs data that is the result of adding the corrective data $\Delta_3$ to the data representing the arithmetic mean of the $B_2$ data and $B_6$ data so that data $(B_2+B_6)/2+\Delta_3$ representing the interpolation target pixel corresponding to the $B_4$ pixel is obtained.

Figure 7A:
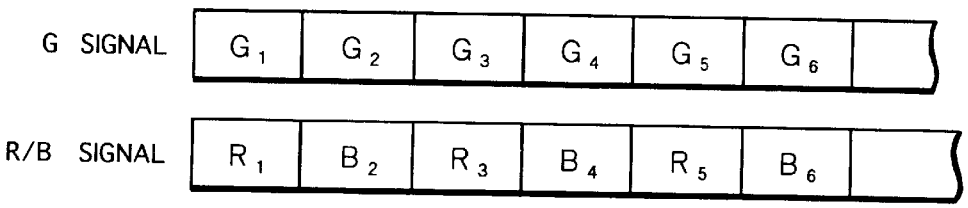
FIGS. 7a through 7c illustrate data (signals) that flow into the various circuits of a scanner and computer.
Figure 7B:
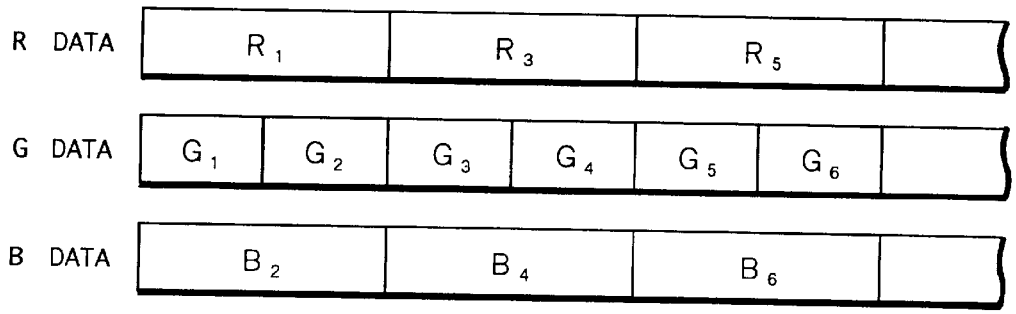
Figure 7C:
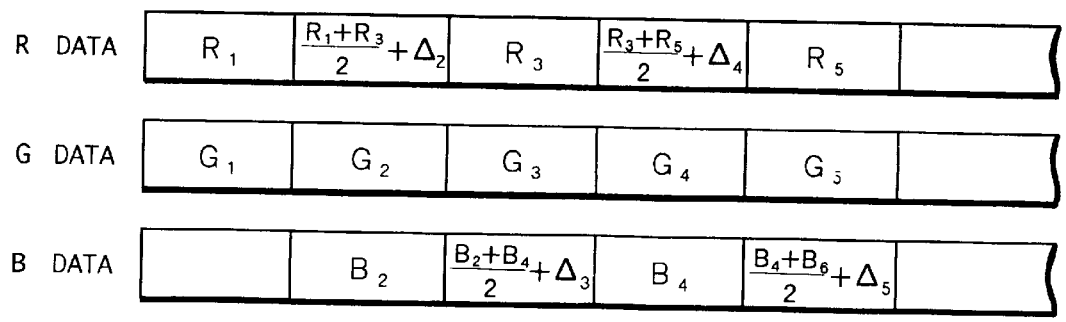

FIG. 6 and FIGS. 7a through 7c illustrate another embodiment of the present invention. FIG. 6 is a block diagram illustrating the electrical configuration of a two-line sensor, and FIGS. 7a through 7c illustrate the G signal (G data), R/B signal, R data and B data which flow into the various circuits of the scanner shown in FIG. 1 or computer shown in FIG. 2. Elements in FIG. 6 identical with those shown in FIG. 3 are designated by like reference characters and need not be described again.

In the two-line sensor 21 shown in FIG. 3, the photodiodes 2 of the line sensor 22 for green and the photodiodes 6 of the line sensor 23 for red and blue are offset from each other by one-half of a pixel. By contrast, in the two-line sensor 21A shown in FIG. 6, the photodiodes 2 of the line sensor 22A for green and the photodiodes 6 of the line sensor 23A for red and blue coincide; i.e. there is no offset between them.

The two-line sensor 21A outputs the G signal as well as the R/B signal, in which the R and B signals appear in alternating fashion.

In a case where the image of interest has been read by the two-line sensor 21A shown in FIG. 6, the G signal and the R/B signal output by the two-line sensor 21A are not subjected to any subsampling processing. That is, the G signal simply passes through the subsampling circuit 28 and the R/B signal simply passes through the subsampling circuit 29.

After the G signal and R/B signal are rendered dot sequential in the combining circuit 30, the signals are converted to digital image data. The dot sequential digital image data is separated into R, G and B data in the RGB separation circuit 50 (see FIG. 7b).

The R, G and B data separated by the RGB separation circuit 50 is applied to the interpolation circuit 60, which proceeds to produce the interpolation target pixel (FIG. 7c) through processing similar to that for producing the interpolation target pixel in the case where the image of interest was read by the above-described two-line sensor 21.

The interpolation of pixels can be realized while the occurrence of false colors at the edge of the image of interest is prevented even in a case where the two-line sensor 21A shown in FIG. 6 is used in the CCD image sensing unit 20 of the scanner.

The corrective data $\Delta$ is added to the data representing the arithmetic mean to apply a correction with regard to the edge of an image of interest. However, the corrective data $\Delta$ becomes zero for portions of the image of interest other than the edge thereof. This makes it possible to prevent the display of colors different from the actual colors of the image of interest.

In the foregoing embodiment, the arithmetic mean of the image data representing the pixels neighboring the interpolation target pixel on both sides thereof is calculated and the corrective data is added to the data representing the arithmetic mean, thereby producing the image data of the interpolation target pixel. However, an arrangement may be adopted in which the arithmetic mean is multiplied by a correction coefficient.

Though the circuits in the scanner and the circuits in the computer are constituted by hardware in the foregoing embodiments, it goes without saying that these circuits may be implemented by software.

As many apparently widely different embodiments of the present invention can be made without departing from the spirit and scope thereof, it is to be understood that the invention is not limited to the specific embodiments thereof except as defined in the appended claims.

What is claimed is:

1. A scanner having a two-linear image sensor, which comprises a linear image sensor for the color green in which a plurality of photo elements corresponding to pixels are arranged in a row and filters which allow transmission of a green light component are provided on the light-receiving surfaces of the photo elements so that the sensor will output a green image signal representing an image of interest, and a linear image sensor for both the colors red and blue in which a plurality of photo elements corresponding to pixels are arranged in a row and in parallel with the linear image sensor for the color green and filters which allow transmission of a red light component and filters which allow transmission of a blue light component are alternately provided on the light-receiving surfaces of the photo elements so that the sensor will output a red image signal and a blue image signal representing an image of interest, and a conveyance device for conveying the image of interest and the two-linear image sensor relative to each other, said scanner comprising:

a red-color average signal calculating circuit for calculating the average of pixel signals represented by the red image signals present on both sides of a red-color interpolation target pixel, which is a portion at which a pixel represented by the red image signal is missing, this pixel being one corresponding to a pixel represented by the green image signal;

a red-color interpolation target pixel correcting circuit for correcting the average signal calculated by said red-color average signal calculating circuit;

a blue-color average signal calculating device for calculating the average of pixel signals represented by the blue color image signals present on both sides of a blue-color interpolation target pixel, which is a portion at which a pixel represented by the blue image signal is missing, this pixel being one corresponding to a pixel represented by the green image signal; and a blue-color interpolation target pixel correcting device for correcting the average signal calculated by said blue-color average signal calculating circuit.

2. The scanner according to claim 1, wherein said linear image sensor for the color green and said linear image sensor for the colors red and blue are offset from each other by approximately one-half pixel in the row direction, said scanner further comprising:

a subsampling circuit for subsampling, at an identical subsampling ratio in accordance with a given ratio, a green pixel, red pixel and blue pixel represented by the green, red and blue image signals, respectively, output by said two-linear image sensor;

said red-color average signal calculating circuit calculating the average of signals of red pixels present on both sides of a red-color interpolation target pixel where a red pixel culled by said subsampling circuit, and corresponding to a green pixel culled by said subsampling circuit, is missing;

said blue-color average signal calculating circuit calculating the average of signals of blue pixels present on both sides of a blue-color interpolation target pixel where a blue pixel culled by said subsampling circuit, and corresponding to a green pixel culled by said subsampling circuit, is missing.

3. The scanner according to claim 1, wherein correction processing in said red-color interpolation target pixel correcting circuit and in said blue-color interpolation target pixel correcting circuit is executed based upon the green image signal.

4. The scanner according to claim 1, wherein correction processing in said red-color interpolation target pixel correcting device and in said blue-color interpolation target pixel correcting device is executed based upon the signal of a green pixel represented by the green image signal and the signals of green pixels neighboring this green pixel on both sides thereof, this green pixel corresponding to the red-color interpolation target pixel and the blue-color interpolation target pixel.

5. The scanner according to claim 1, wherein correction processing in said red-color interpolation target pixel correcting device and said blue-color interpolation target pixel correcting device includes adding a corrective value to the average signals.

6. The scanner according to claim 5, wherein the corrective value is obtained by subtracting an average signal of green image signals representing green pixels neighboring the green pixel on both sides thereof from the green image signal representing the green pixel corresponding to the red-color interpolation target pixel and blue-color interpolation target pixel.

7. A method of generating interpolated pixels in a scanner having a two-linear image sensor, which comprises a linear image sensor for the color green in which a plurality of photo elements corresponding to pixels are arranged in a row and filters which allow transmission of a green light component are provided on the light-receiving surfaces of the photo elements so that the sensor will output a green image signal representing an image of interest, and a linear image sensor for both the colors red and blue in which a plurality of photo elements corresponding to pixels are arranged in a row and in parallel with the linear image sensor for the color green and filters which allow transmission of a red light component and filters which allow transmission of a blue light component are alternately provided on the light-receiving surfaces of the photo elements so that the sensor will output a red image signal and a blue image signal representing an image of interest, and a conveyance device for conveying the image of interest and the two-linear image sensor relative to each other, the method comprising:

a first calculating step of calculating the average of pixel signals represented by the red image signals present on both sides of a red-color interpolation target pixel, which is a portion at which a pixel represented by the red image signal is missing, this pixel being one corresponding to a pixel represented by the green image signal;

a first correcting step of correcting the average signal calculated at said first calculating step;

a second calculating step of calculating the average of pixel signals represented by the blue color image signals present on both sides of a blue-color interpolation target pixel, which is a portion at which a pixel represented by the blue image signal is missing, this pixel being one corresponding to a pixel represented by the green image signal; and a second correcting step of correcting the average signal calculated at said second calculating step.

8. The method according to claim 7, wherein said linear image sensor for the color green and said linear image sensor for the colors red and blue are offset from each other by approximately one-half pixel in the row direction, said method further comprising:

a subsampling step of subsampling, at an identical subsampling ratio in accordance with a given ratio, a green pixel, red pixel and blue pixel represented by the green, red and blue image signals, respectively, output by said two-linear image sensor;

said red-color average signal calculating step calculating the average of signals of red pixels present on both sides of a red-color interpolation target pixel where a red pixel culled at said subsampling step, and corresponding to a green pixel culled at said subsampling step, is missing;

said blue-color average signal calculating step calculating the average of signals of blue pixels present on both sides of a blue-color interpolation target pixel where a blue pixel culled at said subsampling step, and corresponding to a green pixel culled at said subsampling step, is missing.

9. The method according to claim 7, wherein said red-color interpolation target pixel correcting step and said blue-color interpolation target pixel correcting step are executed based upon the green image signal.

10. The method according to claim 7, wherein said red-color interpolation target pixel correcting step and said blue-color interpolation target pixel correcting step are executed based upon the signal of a green pixel represented by the green image signal and the signals of green pixels neighboring this green pixel on both sides thereof, this green pixel corresponding to the red-color interpolation target pixel and the blue-color interpolation target pixel.

11. The method according to claim 7, wherein said red-color interpolation target pixel correcting step and said blue-color interpolation target pixel correcting step include adding a corrective value to the average signals.

12. The method according to claim 11, wherein the corrective value is obtained by subtracting an average signal of green image signals representing green pixels neighboring the green pixel on both sides thereof from the green image signal representing the green pixel corresponding to the red-color interpolation target pixel and blue-color interpolation target pixel.

\* \* \* \* \*